Sept. 29, 1959     C. F. QUACKENBUSH     2,906,683
REACTOR COOLING

Filed April 24, 1953     3 Sheets-Sheet 1

INVENTOR.
Claude F. Quackenbush
BY
Roland A. Anderson
Attorney

Sept. 29, 1959 C. F. QUACKENBUSH 2,906,683
REACTOR COOLING
Filed April 24, 1953 3 Sheets-Sheet 2

INVENTOR.
Claude F. Quackenbush
BY
Roland A. Anderson
Attorney

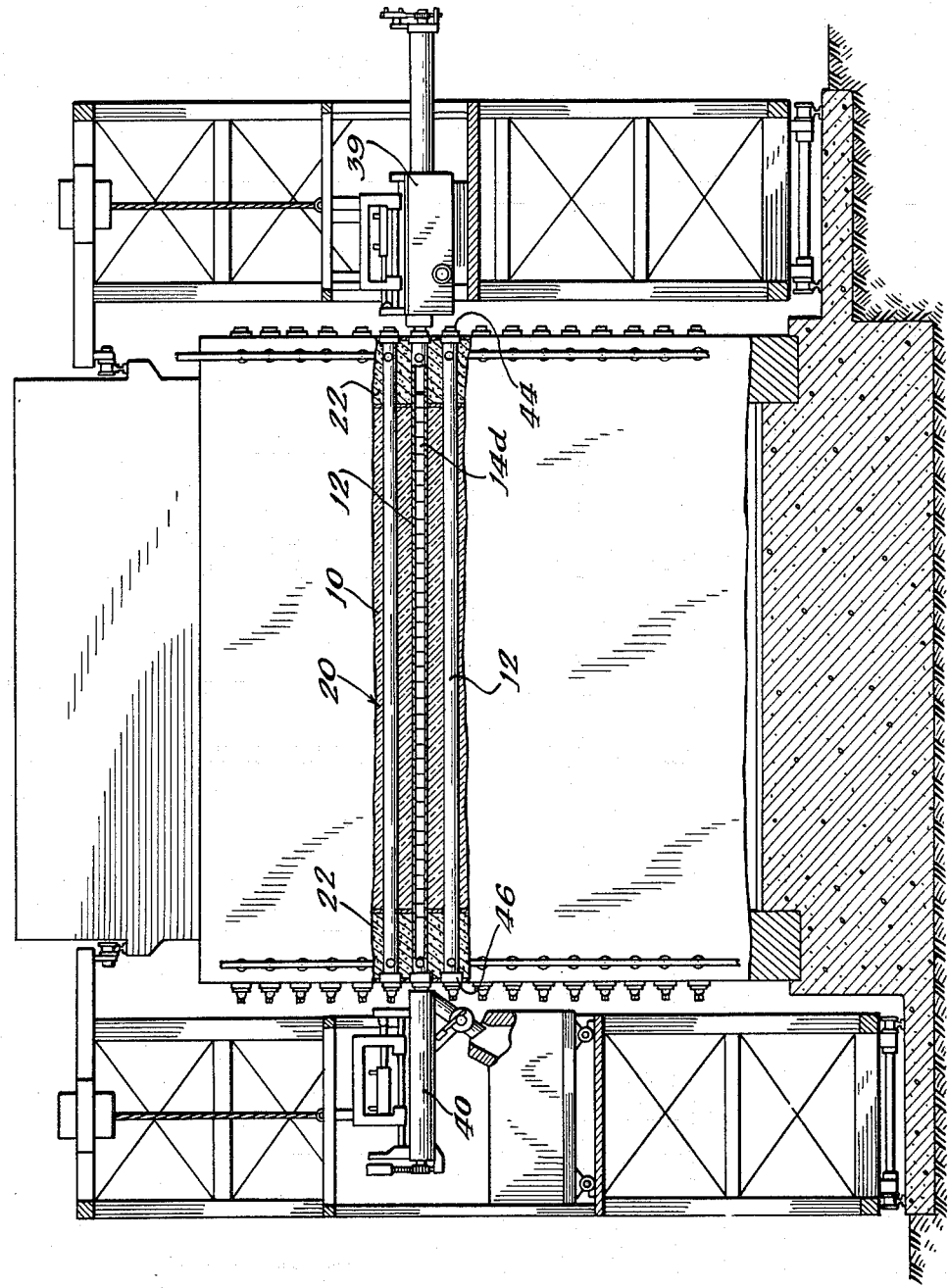

United States Patent Office 2,906,683
Patented Sept. 29, 1959

2,906,683

REACTOR COOLING

Claude F. Quackenbush, Richland, Wash., assignor to the United States of America as represented by the United States Atomic Energy Commission Application April 24, 1953, Serial No. 350,811

2 Claims. (Cl. 204—193.2)

The present invention relates to neutronic reactors, and more particularly to cooled neutronic reactors operating at substantial power levels.

One of the important uses for neutronic reactors is the production of isotopes as a result of neutron irradiation of objects placed within a reactor. Radioactive iodine, radioactive carbon, and plutonium may be produced in this manner. When a neutronic reactor is being operated for the purpose of converting elements from their natural state to radioactive isotopes, the greatest conversion efficiency is obtained by operating the neutronic reactor at the highest power level possible with the particular reactor structure, or in other words, operating the neutronic reactor with the highest permissible neutron flux density. The factor that ultimately limits the neutron flux density will not be the same in all types of reactors, and hence it is necessary to consider specific reactor structure in this connection.

Since a high neutron flux density results in the liberation of large quantities of heat, neutronic reactors designed for isotope conversion are generally cooled by flowing a fluid coolant through the structure. Conventional reactor structures of this type generally utilize a plurality of tubes traversing the reactor in order to carry a fluid coolant through the reactor, and the elements being converted to radioactive isotopes by neutron irradiation are generally disposed within jackets in the tubes traversing the reactor. Often the tubes traversing the reactor are also used to bear the material fissionable by neutrons of thermal energy used to sustain the neutronic chain reaction.

In such a structure, there may be any one of a number of factors which limit the maximum permissible neutron flux density. It is generally considered to be unwise to permit the coolant fluid to change from a liquid state to a gaseous state as a result of the high temperature within the coolant tubes, since such changes in state render the neutronic reactor more difficult to control. If water is used as a coolant, this limitation means that the temperature of the water flowing from the reactor must be maintained at a temperature less than 100° C.

If the capacity of the reactor cooling system is more than adequate to maintain the temperature of the effluent coolant below the limiting temperature, the maximum temperature of the fuel elements within the reactor often constitutes the limiting factor. Much of the heat liberated by the neutronic chain reaction is liberated in the fuel elements of the reactor, since the fuel elements absorb a large portion of the radiations liberated by the reaction. Also, not all fuel elements disposed within any given coolant tube traversing a reactor are heated equally, since the neutron flux densities vary along the length of the coolant tubes. Efforts have been made to "flatten" the neutron flux density across a neutronic reactor, i.e., to construct a neutronic reactor in which the neutron flux density across the reactor is more nearly constant than is experienced in the reactors presently in use. A reactor having no flattening provisions has been found to have a neutron flux distribution approximating a cosine function along any straight line through the reactor. For this reason, the maximum heat liberated in any portion of the reactor occurs at the center of the active portion of the reactor, or at the center of any coolant tube traversing the reactor in a straight line. Thus it is the fuel bodies which are disposed centrally in each coolant tube that experience the highest temperatures.

Stated generally, it is the principal object of the present invention to provide a reactor with a power level limited by the temperature of its fuel elements with means to selectively cool the fuel elements within the reactor in order to permit the reactor to operate at a higher power level.

A particular object of the present invention is to provide a reactor of the type described including tubes bearing the fuel elements and provided with a flow of coolant fluid therethrough with means to cool those fuel elements in regions of high neutron flux to a greater extent than those in regions of lower neutron flux.

Further, it is an object of the present invention to provide such a reactor with means to selectively cool the fuel elements therein when the reactor is operated by means of a continuous discharge method, or by means of an intermittent batch method.

Figure 6 is a view of the neutronic reactor shown in Figure 1 adapted for continuous charging and discharging operation;

Figure 1:
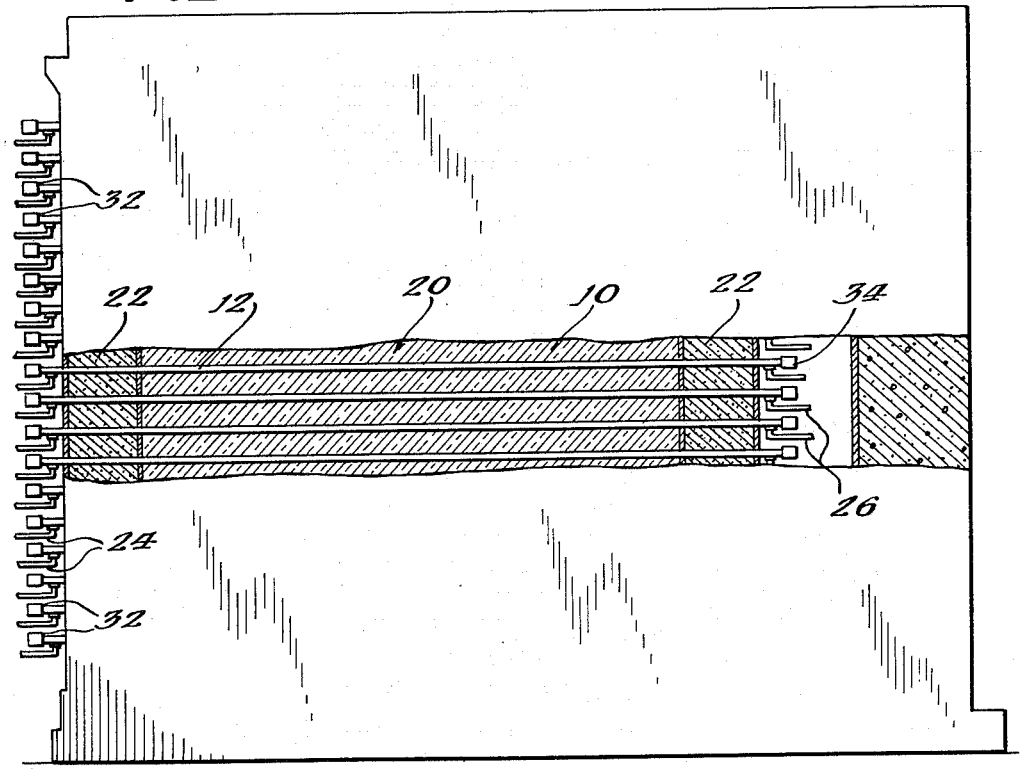
Figure 1 is a view of a neutronic reactor constructed according to the present invention.
Figure 2:
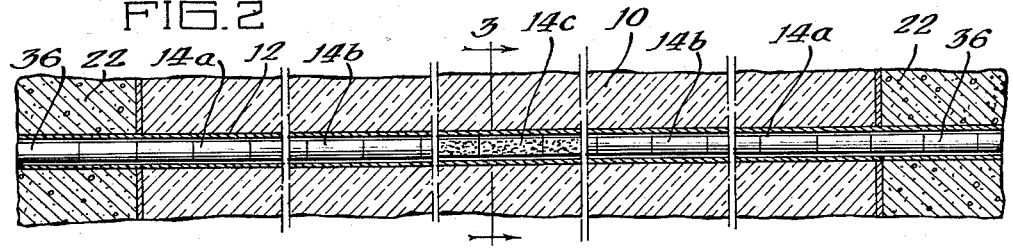
Figure 2 is a fragmentary sectional view of one of the coolant tubes traversing the neutronic reactor shown in Figure 1.

The neutronic reactor shown in the figures is used to illustrate the present invention and utilizes neutrons of thermal energy, even though the present invention may be practiced with a neutronic reactor utilizing neutrons primarily of higher energies. The reactor has a moderator 10 traversed by a plurality of coolant tubes 12. At least some of the coolant tubes 12 contain fuel elements 14 having bodies 16 of material fissionable by neutrons of thermal energy surrounded by jackets 18. The bodies 16 may be constructed of natural uranium, or may consist of or include $U^{233}$, $U^{235}$ or $Pu^{239}$. The jackets 18 are constructed of materials having small neutron capture cross sections, i.e., of the order of 0.5 barn or less, and may be such materials as aluminum or zirconium. The moderator 10 may be constructed of any material having a moderating ratio at least as great as that of water, such as graphite, heavy water, water, or beryllium. The moderating ratio R of a material is defined by the equation $$R = \frac{\sigma_s \xi}{\sigma_c}$$

where $\sigma_s$ is the neutron scattering cross section for the material, $\sigma_c$ the neutron capture cross section for the material, and $\xi$ the mean logarithmic energy loss per collision for a neutron in the material. The region of the neutronic reactor in which the fuel elements 14 are disposed is generally called the active portion of the reactor and has been designated 20. The active portion 20 is surrounded by a particle and radiation shield 22.

Figure 3:
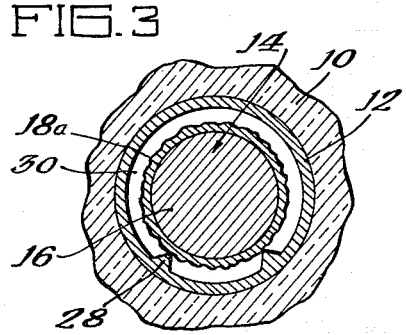
Figure 3 is a sectional view taken along line 3—3 of Figure 2.

The coolant tubes 12 are supplied with a fluid coolant entering at inlets 24 and leaving through outlets 26. Each of the coolant tubes 12 is provided with a pair of ribs 28 at the bottoms thereof, and the fuel elements 14 rest upon the ribs 28, as best illustrated in Figure 3. In each tube 12, the coolant flows through an annulus 30 between the fuel elements 14 and the coolant tube 12. Each of the coolant tubes 12 is provided with an inlet cap 32 and outlet cap 34 which may be removed to charge or discharge fuel elements 14, or other bodies to be processed in order to form radioactive isotopes by absorption of neutrons. The particular reactor disclosed may thus be cooled by a flow of water. The copending patent application of Robert M. Evans, entitled "Reactor," Serial No. 649,407, filed February 21, 1946, discloses the details of a suitable system for water cooling the present reactor.

Further details of neutronic reactors of the type described above may be had by reference to the copending patent application of Leo Szilard and Enrico Fermi, Serial No. 568,904, filed December 19, 1944, now Patent No. 2,708,656.

Figure 4:
Figure 4 is an enlarged view, partly in section, of one of the fuel elements shown in Figure 2.
Figure 5:
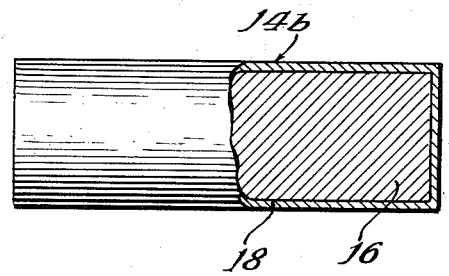
Figure 5 is an enlarged view, partly in section, of a fuel element with a smooth surface, also shown in Figure 1.
Figure 8:
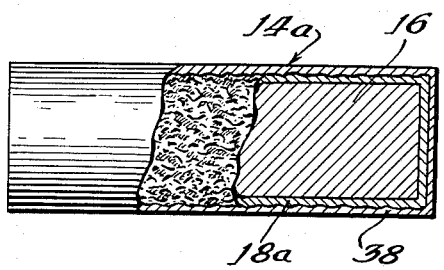
Figure 8 is an enlarged view, partly in section, of one of the roughened fuel elements provided with a heat insulating coating.

In each of the coolant tubes 12, shielding elements 36 are disposed in the portion of the tube 12 traversing the shield 22. At the inlet end of each tube, the fuel elements 14a adjacent to the shield 22 are provided with heat insulating coatings to be described hereafter and shown in Figure 8. The fuel elements 14b nearer the center of the reactor and adjacent to the coated elements 14a have smooth surfaces of material having good thermal conductivity. These fuel elements 14b are identical with fuel elements 14a except they are not coated, as indicated in Figure 5. The fuel elements 14c located in the central portions of each coolant tube 12 are provided with roughened surfaces, and are shown in Figure 4. The discharge ends of the tubes 12 also contain a region of smooth surfaced fuel elements 14b adjacent to the roughened elements 14c at the center of the reactor, and a region of fuel elements 14a having heat insulating coatings 38 adjacent to the shield 22. The portion of the coolant tube 12 traversing the discharge shield 22 also contains shielding elements 36. The shielding elements 36 are shaped identically with fuel elements 14b, but are constructed of neutron and gamma ray absorbing materials, such as lead or iron.

The fuel elements 14c with roughened surfaces provide increased turbulence of the coolant fluid in the region of the tube 12 in which these fuel elements 14c are disposed, thereby providing greater heat transfer between the fuel elements 14c and the coolant. Turbulence of the coolant flow is a function of the coolant annulus 30 and the rate of coolant flow, the smaller the coolant annulus 30 and the greater the rate of coolant flow the more likely the coolant flow will be turbulent. In any coolant flow, a smooth or laminar flow occurs until the rate of flow exceeds a threshold value at which point the flow becomes turbulent. The roughened fuel elements 14c have their greatest advantage with a laminar coolant flow, but do possess certain advantages with a turbulent coolant flow.

The roughened surface of the fuel elements 14c may take virtually any form, as long as they produce turbulence. It has been found that spiral grooves are most readily fabricated, and for this reason are a preferred embodiment.

The coatings 38 on the fuel elements 14a reduce the heat transfer between the fissionable bodies 16 within the fuel elements 14a and the coolant flow, since the coating material has a relatively low heat transfer coefficient. Since these fuel elements 14a are only disposed in peripheral portions of the active portion 20 of the reactor, the fissionable bodies 16 in these fuel elements do not require the large amount of cooling that is required of the fuel elements 14c disposed in the central portions of the active portion 20 of the reactor. Thus, the temperature of the fissionable body 16 within the fuel elements 14a does not become excessive, and the temperature of the coolant flow remains relatively low after passing over the fuel elements 14a. In the central portions of the active portion 20 of the reactor, fuel elements 14c with roughened surfaces are disposed, and hence a relatively large amount of heat may be transferred from the fissionable bodies 16 of the fuel elements 14c to the coolant flow. In the regions between fuel elements 14a and 14c, fuel elements 14b with smooth surfaces transfer an intermediate quantity of heat from the fissionable bodies 16 in these fuel elements 14b to the coolant flow. Hence, the bodies of fissionable material 16 in each tube 12 of the reactor are maintained at a more uniform temperature than is possible if only one type of fuel element 14 were used.

Figure 7:
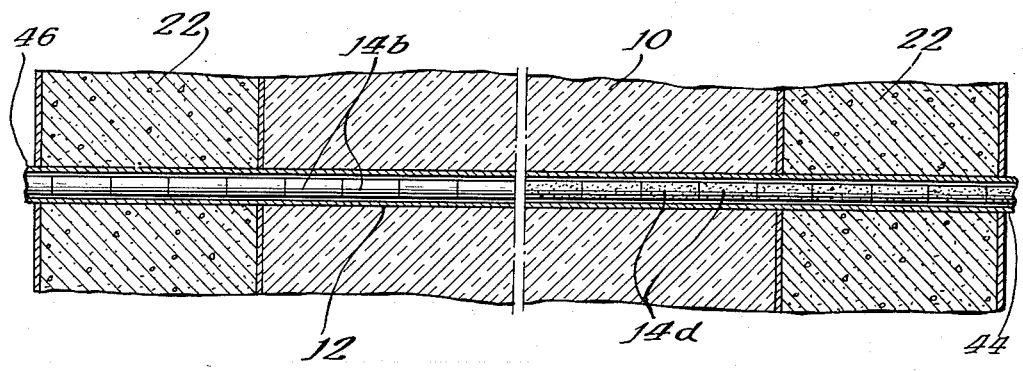
Figure 7 is an enlarged sectional view of a fragment of the reactor shown in Figure 6 showing one of the coolant tubes.
Figure 9:
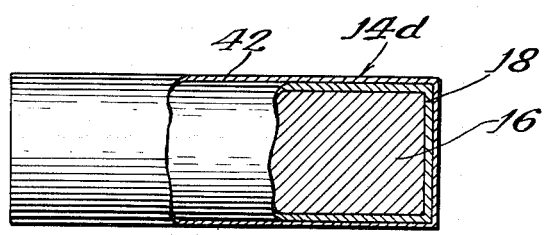
Figure 9 is an enlarged view, partly in section, of a smooth surfaced fuel element with a heat insulating coating.

Figures 6 and 7 show a modification of the present invention. Here the same reactor shown in the other figures is employed, but only coated fuel elements 14d are disposed within the coolant tubes 12, and these are continuously irradiated as they are pushed through the tubes 12 from a charging end 44 to a discharging end 46.

In order to continuously irradiate the fuel elements 14, or other bodies, in the coolant tubes 12, a continuous charging machine 39 is disposed at the charging end 44 of the coolant tubes 12, and a continuous discharging machine 40 is disposed at the discharging end 46 of the coolant tubes 12. Neither the charging machine 39 nor the discharging machine 40 will be described in detail, since a suitable charging machine is disclosed in the copending patent application of Phillips P. Smith, Serial No. 243,965, filed August 28, 1951, now Patent No. 2,725,993, and a suitable discharging machine is disclosed in the copending application of Phillips P. Smith, Serial No. 212,035, filed February 21, 1951.

The charging machine 39 inserts into the reactor fuel elements 14d coated with a heat insulating coating 42 shown in Fig. 7. As new fuel elements are inserted into the coolant tubes 12, the partially irradiated fuel elements 14d slide toward the discharge end 46 of the coolant tubes 12. The coatings 42 are dissolvable coatings, being slowly soluble in the coolant medium, so that the coatings are entirely removed from the fuel elements 14d by the time they have been translated to the center portion of the active portion 20 of the reactor. In this manner, the heat insulation is effective only adjacent to the charging end 44 of the coolant tubes 12, so that the temperature of the fuel elements run higher adjacent to the charging end 44 than would be possible without the heat insulating coatings 42. Also, the temperature of the water at the center portion of the reactor is lower than it would be without the heat insulating coatings 42 on the fuel elements 14d adjacent to the charging end of the tubes 12, and the water at the center of the reactor is able to remove a larger proportion of the heat at this point than would be possible otherwise. At the discharge end 46 of the coolant tubes 12, the coolant flow is at an elevated temperature, thereby providing only sufficient cooling to maintain the surface temperatures of the fuel element 14d in this region within permissible limits.

The coatings 38 and 42 may be constructed of any material having suitable physical properties including a heat transfer coefficient at least one order of magnitude less than that of the jackets on the fuel elements, or other barrier between the fissionable material and coolant flow. Several types of materials have been employed for the coatings 38 and 42 in a water cooled reactor, these being casein glue coatings, polyvinyl butyral coatings, and non-strippable coatings of the so-called Epon type, i.e., a condensation polymer of epichlorohydrin and bis-phenol. In general, the soluble coatings 42 should exhibit controlled solubility in the reactor cooling medium, freedom from breakdown under radioactive attack, a negligible effect upon the neutron flux densities within the reactor, freedom from shielding properties, stability when operated at elevated temperatures, good adhesion to the exterior of the fuel elements, considerable resistance to abrasion, and should have little or no effect upon the process of removal of the jackets 18 after the fuel elements 14 have been irradiated. It has been found that casein glue is a suitable dissolvable heat insulating coating 42 with water as the coolant. Coatings 38 should be relatively insoluble in the coolant medium for the period of exposure. If water is the coolant, polyvinyl butyral and Epon type coatings are satisfactory.

In some applications, it may be desirable to use roughened fuel elements 14c with a heat insulating coating 42. This has a considerable advantage for continuously discharged reactors, since the coated surface adjacent to the charging end 44 will transfer a comparatively small amount of heat to the coolant fluid, and the roughened surface which will come in contact with the coolant fluid as the heat insulating coating 42 dissolves will present a good heat transfer surface in the portions of the reactor where the greatest amount of heat is liberated.

The man skilled in the art will readily devise many other modifications of the present invention from a reading of the foregoing description. For example, it is within the scope of the present invention to utilize a heat conduction barrier in other forms than the coating upon the fuel elements within a reactor. This heat conduction barrier could be constructed in the reactor between the fuel elements and the flow of fluid coolant, and could include materials which would not form suitable coatings for fuel elements such as fiber glass or asbestos. Hence, it is intended for the scope of the present invention be not limited by the specific embodiments herein disclosed, but rather only by the appended claims.

What is claimed is:

1. A neutronic reactor comprising an active portion having a plurality of tubes extending therethrough and fuel elements containing material fissionable by neutrons of thermal energy disposed within the tubes said fuel elements being provided with jackets constructed of materials having a high coefficient of heat conduction, and means to flow a fluid coolant through the tubes from an inlet end to an outlet end characterized by the improved construction wherein the fuel elements adjacent to the periphery of the active portion at each end of the tubes are coated with a material having a coefficient of heat conduction at least an order of magnitude less than that of the jacket, and the jackets of the fuel elements disposed within the central portion of the active portion are provided with roughened surfaces of material.

2. A neutronic reactor comprising an active portion having a plurality of tubes extending therethrough and fuel elements containing material fissionable by neutrons of thermal energy disposed within the tubes, said fuel elements being provided with jackets of material having a high coefficient of heat conduction, and means to flow a fluid coolant from an inlet end to an outlet end through the tubes characterized by the improved construction wherein at least one of the tubes contain fuel elements coated with a material having a coefficient of heat conduction at least an order of magnitude less than that of the fuel element jackets adjacent to the inlet and outlet ends thereof, fuel elements having jackets provided with spirally grooved surfaces disposed centrally within the tube, and fuel elements having jackets with smooth surfaces disposed between the coated fuel elements and the fuel elements with roughened surfaces.

References Cited in the file of this patent

UNITED STATES PATENTS

| | | |
|---|---|---|
| 2,159,571 | Stack | May 23, 1939 |
| 2,266,956 | Brundage | Dec. 23, 1941 |
| 2,420,373 | Hagberg | May 13, 1947 |
| 2,708,656 | Fermi et al. | May 17, 1955 |
| 2,774,730 | Young | Dec. 18, 1956 |
| 2,782,158 | Wheeler | Feb. 19, 1957 |

FOREIGN PATENTS

| | | |
|---|---|---|
| 286,658 | Switzerland | Mar. 2, 1953 |

OTHER REFERENCES

McAdams: "Heat Transmission," 2nd ed., McGraw-Hill Book Co., New York (1942), page 175.

H. D. Smyth: "A General Account of the Development of Methods of Using Atomic Energy for Military Purposes," August 1945, pages 103, 104, 105.

Nucleonics, February 1950, pp. 54–58 (an article by Ohlinger).

Atomics, June 1951, pp. 176–180.

Atomic Energy Commission MDDC–403, "Water Problems in the Industrial Application of the Utilization of Atomic Energy," by I. Perlman (8 pages). Copy obtainable from AEC at Oak Ridge, Tenn.